US011423337B2

(12) United States Patent
Vinyals et al.

(10) Patent No.: US 11,423,337 B2
(45) Date of Patent: Aug. 23, 2022

(54) TRAINING DISTILLED MACHINE LEARNING MODELS

(71) Applicant: Google LLC, Mountain View, CA (US)

(72) Inventors: Oriol Vinyals, London (GB); Jeffrey Adgate Dean, Palo Alto, CA (US); Geoffrey E. Hinton, Toronto (CA)

(73) Assignee: Google LLC, Mountain View, CA (US)

( * ) Notice: Subject to any disclaimer, the term of this patent is extended or adjusted under 35 U.S.C. 154(b) by 310 days.

(21) Appl. No.: 16/841,859

(22) Filed: Apr. 7, 2020

(65) Prior Publication Data

US 2020/0234192 A1 Jul. 23, 2020

Related U.S. Application Data

(63) Continuation of application No. 16/368,526, filed on Mar. 28, 2019, now Pat. No. 10,650,328, which is a continuation of application No. 14/731,349, filed on Jun. 4, 2015, now Pat. No. 10,289,962.

(60) Provisional application No. 62/008,998, filed on Jun. 6, 2014.

(51) Int. Cl.
*G06N 20/20* (2019.01)
*G06N 7/00* (2006.01)
*G06N 20/00* (2019.01)
*G06N 3/04* (2006.01)
*G06N 3/08* (2006.01)

(52) U.S. Cl.
CPC .......... *G06N 20/20* (2019.01); *G06N 3/0454* (2013.01); *G06N 3/084* (2013.01); *G06N 7/00* (2013.01); *G06N 7/005* (2013.01); *G06N 20/00* (2019.01)

(58) Field of Classification Search
CPC ...... G06N 20/20; G06N 3/0454; G06N 3/084; G06N 7/00; G06N 7/005; G06N 20/00
See application file for complete search history.

(56) References Cited

U.S. PATENT DOCUMENTS

| | | |
|---|---|---|
| 6,192,351 B1 | 2/2001 | Persaud |
| 2004/0002931 A1 | 1/2004 | Platt |
| 2014/0122401 A1 | 5/2014 | Collica |

OTHER PUBLICATIONS

Bucila et al., "Model Compression," In Proceedings of the International Conference on Knowledge Discovery and Data Mining (KDD), pp. 535-541, Aug. 2006.
(Continued)

*Primary Examiner* — Michael J Huntley
*Assistant Examiner* — Oluwatosin O Alabi
(74) *Attorney, Agent, or Firm* — Fish & Richardson P.C.

(57) ABSTRACT

Methods, systems, and apparatus, including computer programs encoded on computer storage media, for training a distilled machine learning model. One of the methods includes training a cumbersome machine learning model, wherein the cumbersome machine learning model is configured to receive an input and generate a respective score for each of a plurality of classes; and training a distilled machine learning model on a plurality of training inputs, wherein the distilled machine learning model is also configured to receive inputs and generate scores for the plurality of classes, comprising: processing each training input using the cumbersome machine learning model to generate a cumbersome target soft output for the training input; and training the distilled machine learning model to, for each of the training inputs, generate a soft output that matches the cumbersome target soft output for the training input.

20 Claims, 4 Drawing Sheets

(56) References Cited

OTHER PUBLICATIONS

Cheng, Y., Wang, D., Zhou, P., & Zhang, T. (2017). A survey of model compression and acceleration for deep neural networks. arXiv preprint arXiv:1710.09282. (Year: 2017).
CN Office Action in Chinese Application No. 201510435904.1, dated Jun. 28, 2019, 8 pages (with English translation).
CN Office Action in Chinese Application No. 201510435904.1, dated Nov. 22, 2019, 8 pages (with machine translation).
CN Office Action in Chinese Appln. No. 201510435904.1, dated Feb. 3, 2020, 7 pages (with English translation).
Extended European Search Report in Application No. 15170888.0, dated Nov. 17, 2016, 14 pages.
Extended European Search Report in Application No. 19173347.6, dated Jul. 31, 2019, 9 pages.
Hinton, G. E., Osindero, S., & Teh, Y. W. (2006). A fast learning algorithm for deep belief nets. Neural computation, 18(7), 1527-1554 (Year: 2006).
Jacobs et al., "Adaptive mixtures of local experts," Neural Computation, 3(1):79-87, 1991.
Kianercy, A., & Galstyan, A. (2012). Dynamics of Boltzmann Q learning in two-player two-action games. Physical Review E, 85(4), 041145 (Year: 2012).
Li et al., "Learning Small-size DNN with Output-Distribution-Based Criteria," Interspeech, Sep. 1, 2014, pp. 1-5.
Masoudnia et al., "Mixture of experts: a literature survey," Artificial Intelligence Review, vol. 42m No. 2, May 12, 2012, pp. 275-293.
Office Action issued in European Application No. 15170888.0 dated Jan. 30, 2018, 6 pages.
Sharkey, A. J. C. (1996). On combining artificial neural nets. Connection Science, 8(3-4), 299-314. (Year: 1996).
Vesely, "Economic Classification and regression problems and neural networks," Agricultural Economics, vol. 57, Jan. 1, 2011, pp. 150-157.
Zeng, "Using a Neural Network to Approximate an Ensemble of Classifiers," Neural Processing Letters, col. 12, No. 3, Dec. 1, 2000, 13 pages.
EP Summons in European Application No. 19173347.6, dated Sep. 9, 2020, 7 pages.
EP Office Action in European Application No. 19173347.6, dated May 11, 2020, 4 pages.
EP Decision to Refuse a European Patent in European Application No. 19173347.6, dated Apr. 16, 2021, 16 pages.

TRAINING DISTILLED MACHINE LEARNING MODELS

CROSS-REFERENCE TO RELATED APPLICATION

This is a continuation application of, and claims priority to, U.S. patent application Ser. No. 16/368,526, titled "TRAINING DISTILLED MACHINE LEARNING MODELS," filed on Mar. 28, 2019, which application claims priority to, U.S. patent application Ser. No. 14/731,349, titled "TRAINING DISTILLED MACHINE LEARNING MODELS," filed on Jun. 4, 2015, which application claims priority to U.S. Provisional Application No. 62/008,998, filed on Jun. 6, 2014. The disclosure of the prior applications are considered part of and are incorporated by reference in the disclosure of this application.

BACKGROUND

This specification relates to training machine learning models.

A machine learning model receives input and generates an output based on the received input and on values of the parameters of the model. For example, machine learning models may receive an image and generate a score for each of a set of classes, with the score for a given class representing a probability that the image contains an image of an object that belongs to the class.

The machine learning model may be composed of, e.g., a single level of linear or non-linear operations or may be a deep network, i.e., a machine learning model that is composed of multiple levels, one or more of which may be layers of non-linear operations. An example of a deep network is a neural network with one or more hidden layers.

SUMMARY

In general, this specification describes techniques for training a distilled machine learning model using a cumbersome machine learning model.

Particular embodiments of the subject matter described in this specification can be implemented so as to realize one or more of the following advantages. A distilled machine learning model that is easier to deploy than a cumbersome machine learning model, i.e., because it requires less computation, memory, or both, to generate outputs at run time than the cumbersome machine learning model, can effectively be trained using a cumbersome neural network that has already been trained. Once trained using the cumbersome machine learning model, the distilled machine learning model can generate outputs that are not significantly less accurate than outputs generated by the cumbersome machine learning model despite being easier to deploy or using fewer computational resources than the cumbersome machine learning model.

An ensemble model that includes one or more full machine learning models and one or more specialist machine learning models can more accurately generate scores to classify a received input. In particular, by including specialist machine learning models in the ensemble model, the scores for classes that are frequently predicted together or confused by the full machine learning models can be more accurately generated.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
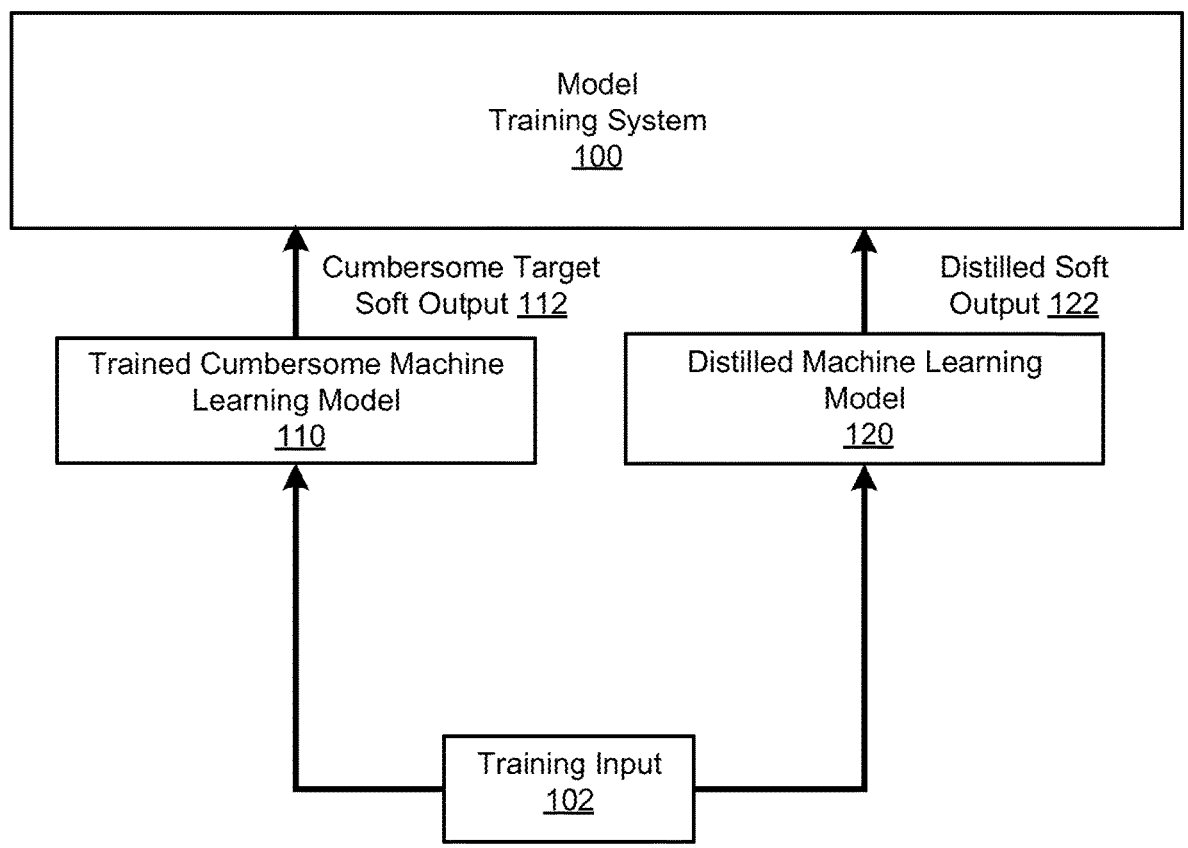
FIG. 1 shows an example distilled machine learning model training system.

FIG. 1 is a block diagram of an example distilled machine learning model training system 100 for training a distilled machine learning model 120. The distilled machine learning model training system 100 is an example of a system implemented as computer programs on one or more computers in one or more locations, in which the systems, components, and techniques described below are implemented.

The distilled machine learning model training system 100 trains the distilled machine learning model 120 using a trained cumbersome machine learning model 110. Generally, a machine learning model receives input and generates an output based on the received input and on values of the parameters of the model.

In particular, both the distilled machine learning model 120 and the trained cumbersome machine learning model 110 are machine learning models that have been configured to receive an input and to process the received input to generate a respective score for each class in a predetermined set of classes. Generally, the distilled machine learning model 120 is a model that has a different architecture from the cumbersome machine learning model 110 that makes it easier to deploy than the cumbersome machine learning model 110, e.g., because the distilled machine learning model 120 requires less computation, memory, or both, to generate outputs at run time than the cumbersome machine learning model 110. For example, the distilled machine learning model 120 may have fewer layers, fewer parameters, or both than the cumbersome machine learning model 110.

The trained cumbersome machine learning model 110 has been trained on a set of training inputs using a conventional machine learning training technique to determine trained values of the parameters of the cumbersome machine learning model 110. In particular, the trained cumbersome machine learning model 110 has been trained so that the score generated by the trained cumbersome machine learning model 110 for a given class for a given input represents the probability that the class is an accurate classification of the input.

For example, if the inputs to the cumbersome machine learning model 110 are images, the score for a given class may represent a probability that the input image contains an image of an object that belongs to the class. As another example, if the inputs to the cumbersome machine learning model 110 are text segments, the classes may be topics, and the score for a given topic may represent a probability that the input text segment relates to the topic.

In some cases, the cumbersome machine learning model 110 is a single machine learning model. In some other cases, the cumbersome machine learning model 110 is an ensemble machine learning model that is a compilation of multiple individual machine learning models that have been trained separately, with the outputs of the individual machine learning models being combined to generate the output of the cumbersome machine learning model 110. Further, in some cases, the models in the ensemble machine learning model include one or more full models that generate scores for each of the classes and one or more specialist models that generate scores for only a respective subset of the classes. An ensemble machine learning model that includes one or more full models and one or more specialist models is described in more detail below with reference to FIGS. 3 and 4.

The model training system 100 trains the distilled machine learning model 120 on a set of training inputs in order to determine trained values of the parameters of the distilled machine learning model 120 so that the score generated by the distilled machine learning model 120 for a given class for a given input also represents the probability that the class is an accurate classification of the input.

In particular, to train the distilled machine learning model 120, the model training system 100 configures both the distilled machine learning model 120 and the cumbersome machine learning model 110 to, during training of the distilled machine learning model 120, generate soft outputs from training inputs.

A soft output of a machine learning model for a given input includes a respective soft score for each of the classes that is generated by the last layer of the machine learning model. The soft scores define a softer score distribution over the set of classes for the input than scores generated by the machine learning model for the input after the machine learning model has been trained.

In particular, in some implementations, the last layer of both the distilled machine learning model 120 and the cumbersome machine learning model 110 is a softmax layer that generates a score $q_i$ for a given class i that satisfies:

$$q_i = \frac{\exp\left(\frac{z_i}{T}\right)}{\sum_j \exp\left(\frac{z_j}{T}\right)}$$

where $z_i$ is a weighted combination of the outputs of a previous layer of the machine learning model for the class i received by the last layer, j ranges from 1 to a total number of classes, and T is a temperature constant. In these implementations, the model training system 100 configures both the distilled machine learning model 120 and the cumbersome machine learning model 110 to generate soft outputs by setting T to a higher value than used for T to generate scores after the machine learning model has been trained. For example, after training, the value of T for the distilled machine learning model 120 can be set equal to 1 while, during training, the value of T can be set equal to 20. The cumbersome machine learning model 110 and the distilled machine learning model 120 use the same value of T to generate soft outputs during training of the distilled machine learning model 120.

Thus, a soft output of a machine learning model is an output of the model using current values of the parameters, but with the value of T for the last layer of the model being increased to a value that is greater than the value used to generate outputs after the model has been trained, e.g., increased to a value that is greater than 1.

During the training, the model training system 100 processes each training input, e.g., a training input 102, using the cumbersome machine learning model 110 to generate a cumbersome target soft output for the training input, e.g., a cumbersome target soft output 112 for the training input 102. The model training system 100 also processes the training input using the distilled machine learning model 120 to generate a distilled soft output for the training input, e.g., a distilled soft output 132 for the training input 102. The model training system 100 then trains the distilled machine learning model 120 to generate soft outputs that match the cumbersome target soft outputs for the training inputs by adjusting the values of the parameters of the distilled machine learning model 120. Training the distilled machine learning model 120 is described in more detail below with reference to FIG. 2.

Figure 2:
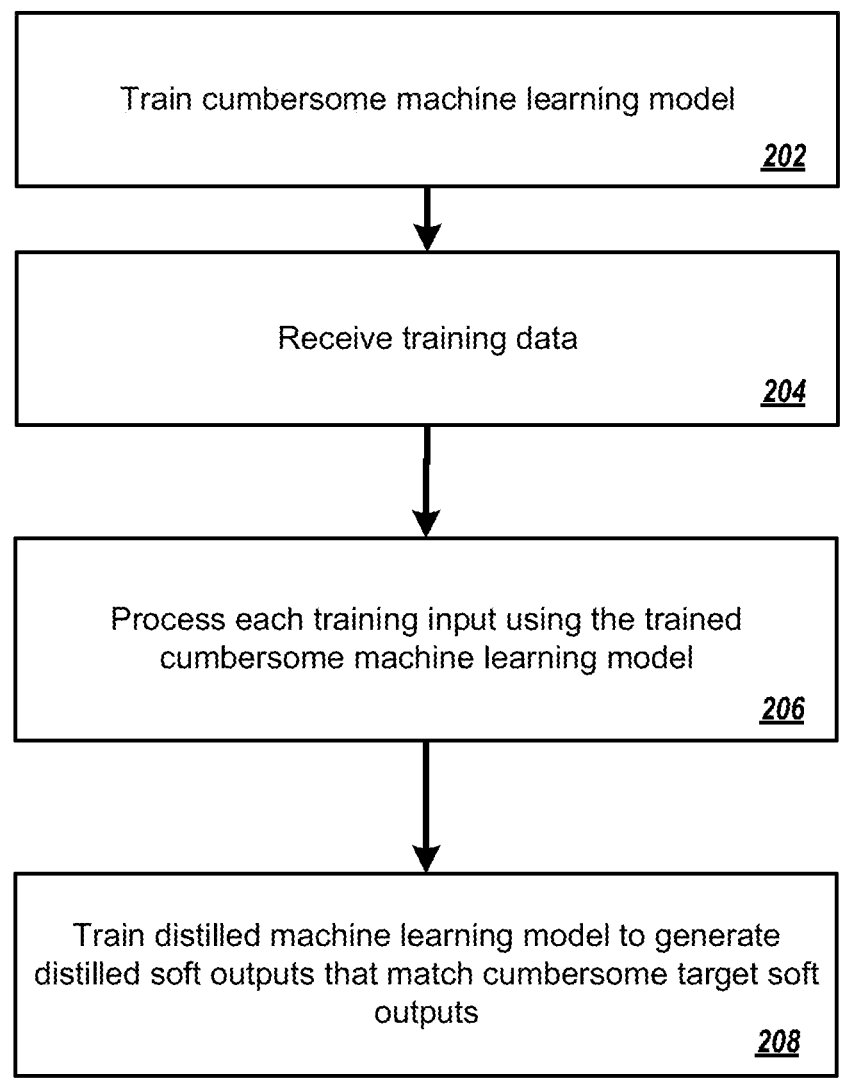
FIG. 2 is a flow diagram of an example process for training a distilled machine learning model using a trained cumbersome machine learning model.

FIG. 2 is a flow diagram of an example process 200 for training a distilled machine learning model. For convenience, the process 200 will be described as being performed by a system of one or more computers located in one or more locations. For example, a model training system, e.g., the model training system 100 of FIG. 1, appropriately programmed, can perform the process 200.

The system trains a cumbersome machine learning model, e.g., the cumbersome machine learning model 110 of FIG. 1, to determine trained values of the parameters of the cumbersome machine learning model using conventional machine learning training techniques (step 202). In particular, the system trains the cumbersome machine learning model on a set of training inputs to process an input to effectively generate a respective score for each class in a predetermined set of classes.

The system receives training data for training a distilled machine learning model, e.g., the distilled machine learning model 120 of FIG. 1 (step 204). The training data includes a set of training inputs that may be the same training inputs used to train the cumbersome machine learning model or different training inputs from the training inputs used to train the cumbersome machine learning model.

The system processes each training input in the set of training inputs using the trained cumbersome machine learning model to determine a respective cumbersome target soft output for the training input (step 206). As described above, a soft output includes a respective soft score for each of the classes. The soft scores for a given training input define a softer score distribution over the set of classes for the input than scores generated by the machine learning model for the input after the machine learning model has been trained.

The system trains the distilled machine learning model to generate distilled soft outputs for the training inputs that match the cumbersome target soft outputs for the training input (step 208).

In particular, for a given training input, the system processes the training input using the distilled machine learning model to generate a distilled soft output for the training input in accordance with current values of the parameters of the distilled machine learning model. The system then determines an error between the cumbersome target soft output for the training input and the distilled soft output for the training input. The system then uses the error to adjust the values of the parameters of the distilled machine learning model, e.g., using conventional machine learning training techniques. For example, if the distilled machine learning model is a deep neural network, the system can use a gradient descent with backpropagation technique to adjust the values of the parameters of the distilled machine learning model.

Optionally, the system can also train the distilled machine learning model using hard targets for the training input. A hard target for a training input is a set of scores that includes a 1 for each correct or known class for the training input, i.e., each class that the training input should be classified into by the distilled machine learning model, and a 0 for each other class. In particular, the system can determine one error between the cumbersome target soft output for the training input and the distilled soft output for the training input and another error between the hard target for the training input and a distilled unsoftened output for the training input. The unsoftened output is a set of scores generated for the training input by the distilled machine learning model using the temperature that will be used after the model is trained. The system can then use both errors to adjust the values of the parameters of the distilled machine learning model using conventional machine learning training techniques, e.g., by backpropagating gradients computed using both errors through the layers of the distilled machine learning model.

Figure 3:
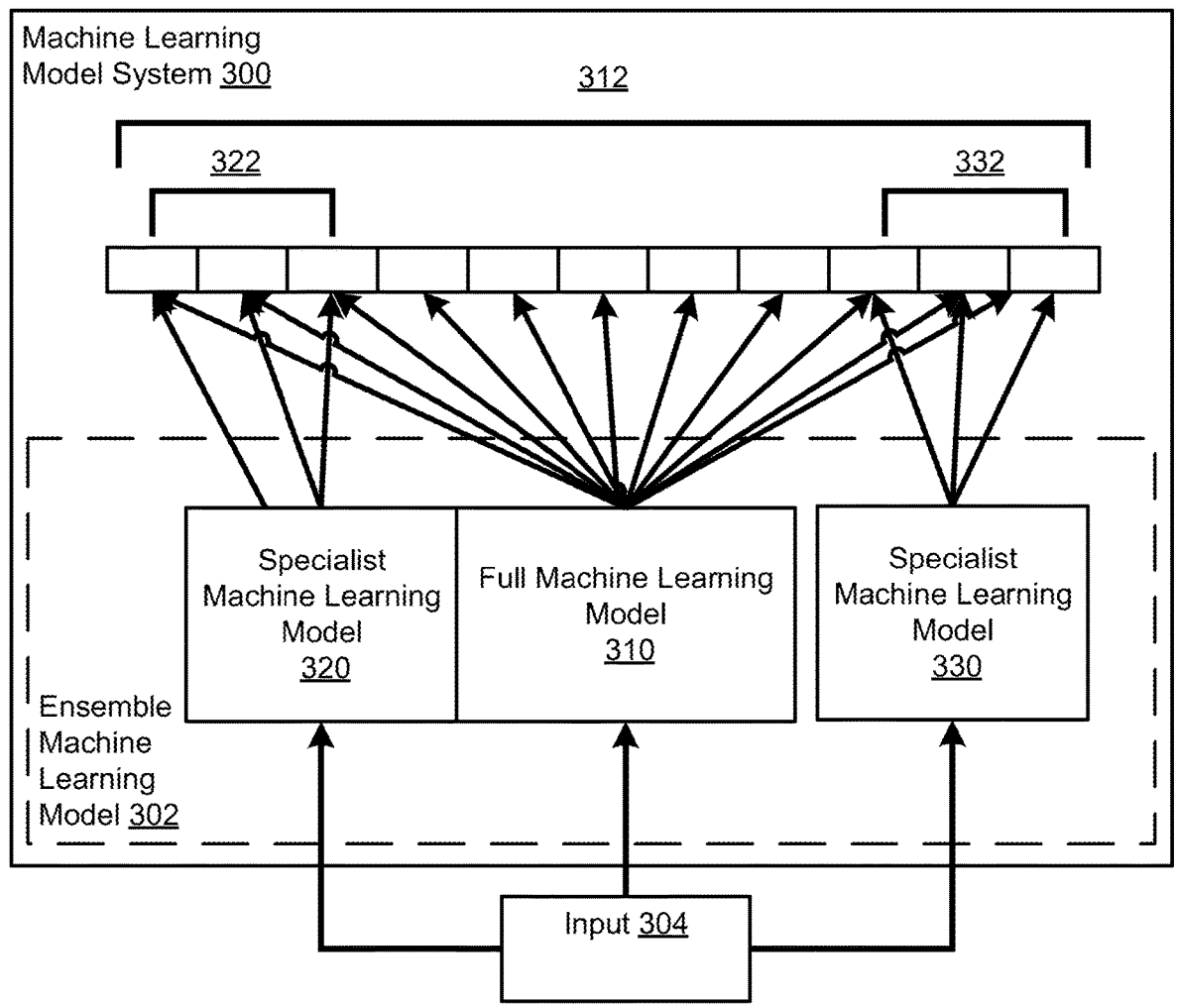
FIG. 3 shows an example machine learning model system.

FIG. 3 shows an example machine learning model system 300. The machine learning model system 300 is an example of a system implemented as computer programs on one or more computers in one or more locations, in which the systems, components, and techniques described below are implemented.

The machine learning model system 300 processes inputs, e.g., an input 304, using an ensemble machine learning model 302 to generate a respective score for each class in a predetermined set of classes 312.

The ensemble machine learning model 302 is an ensemble machine learning model that includes one or more specialist machine learning models, e.g., a specialist machine learning model 320 and a specialist machine learning model 330, and one or more full machine learning models, e.g., a full machine learning model 310. Each of the machine learning models in the ensemble machine learning model 302 has been trained separately to generate scores that represent probabilities, e.g., using conventional machine learning training techniques.

Each full machine learning model is configured to process an input, e.g., the input 304, generate a respective score for each class in the predetermined set of classes 312. While only one full machine learning model 310 is illustrated in the example of FIG. 3, the ensemble machine learning model 302 can include multiple full machine learning models that each process the input 304 to generate a respective set of scores for the input, with each set including a respective score for each of the classes.

Each specialist machine learning model, however, is configured to generate a respective score for only a subset of the classes in the set of classes 312. In the example of FIG. 3, the specialist machine learning model 320 is configured to generate scores for a subset 322 of the set of classes 312 while the specialist machine learning model 330 is configured to generate scores for a subset 332 of the set of classes 312. In some implementations, each specialist machine learning model may also be configured to generate a score for a dustbin class, i.e., an aggregate of all of the classes not included in the subset for the specialist machine learning model.

To generate the final scores for the set of classes for the input 304, the machine learning model system 300 processes the input using each full machine learning model to determine an initial set of scores for the input 304. The machine learning model system 300 then determines, from the initial scores for the input 304, whether or not to include scores generated by any of the specialist machine learning models in the final scores for the input 302. Processing an input to generate a set of final scores for the input is described in more detail below with reference to FIG. 4.

In some cases, the machine learning model system 300 selects the subsets that are assigned to each specialist model by selecting the subsets such that classes that are frequently predicted together by the full machine learning models are included in the same subset. That is, the machine learning model system 300 can select the subsets such that classes that are frequently scored similarly by the full machine learning models are assigned to the same subset.

In particular, the machine learning model system 300 can generate a covariance matrix of scores generated by the full models, i.e., the initial scores as described below with reference to FIG. 4, for a set of inputs processed by the full models. The machine learning model system 300 can then apply a clustering technique, e.g., a K-means clustering technique, to the columns of the covariance matrix to cluster the classes, with each cluster being assigned as the subset of one or more specialists. The machine learning model system 300 can then train each specialist machine learning model to effectively generate scores for the subset of classes assigned to the specialist and, optionally, for the dustbin class.

Figure 4:
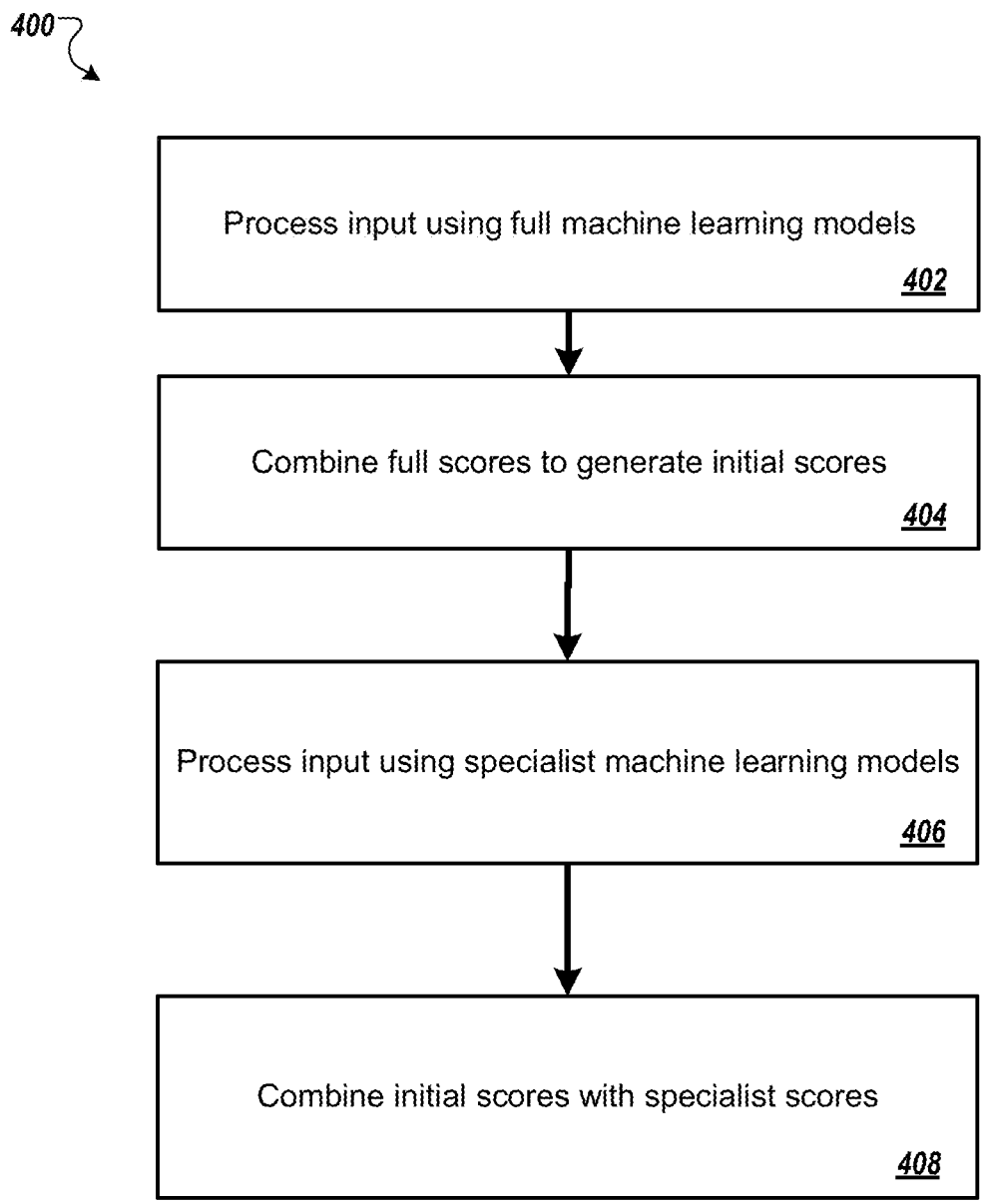
FIG. 4 is a flow diagram of an example process for processing an input using an ensemble machine learning model that includes one or more full machine learning models and one or more specialist machine learning models.

FIG. 4 is a flow diagram of an example process 400 for processing an input using an ensemble machine learning model that includes one or more full machine learning models and one or more specialist machine learning models. For convenience, the process 400 will be described as being performed by a system of one or more computers located in one or more locations. For example, a machine learning model system, e.g., the machine learning model system 300 of FIG. 3, appropriately programmed, can perform the process 400.

The system processes the input using each full machine learning model to generate a respective set of full scores for each full machine learning model (step 402). Each set of full scores includes a respective full score for each class in the set of classes.

The system combines the full scores to generate initial scores for the input (step 404). For example, the system can combine the full scores by, for each class, taking an arithmetic or geometric mean of each full score generated for the class across the full models. If there are not specialist models in the ensemble machine learning model, the system uses the initial scores as the final scores for the input.

If there are specialist models in the ensemble machine learning model, the system selects classes for which the initial score is high enough (step 406). The system can determine that the initial score is high enough for each class having a score that exceeds a threshold score or each class having a score that is in a threshold number of highest scores.

The system processes the input using each specialist machine learning model that is assigned a subset of classes that includes at least one of the selected classes to generate a respective set of specialist scores for the input (step 408). In some implementations, the system processes the input using each of the specialist machine learning models and then only uses the scores generated by the specialist machine learning models that are assigned a subset of classes that includes at least one of the selected classes. In some other implementations, after the classes have been selected, the system processes the input only using the specialist machine learning models that are assigned a subset of classes that includes at least one of the selected classes.

The system combines the initial scores with the specialist scores to generate the final scores for the input (step 410). For example, the system can combine the scores by, for each class, taking an arithmetic or geometric mean of the initial score generated for the class and the specialist scores generated for the class. As another example, the system can combine the scores by, for each class, taking an arithmetic or geometric mean of the full scores generated for the class and the specialist scores generated for the class.

When the ensemble machine learning model is the cumbersome machine learning mode that is used for training a distilled machine learning model as described above with reference to FIGS. 1 and 2, the system sets the temperature to the same higher value for each model in the ensemble machine learning model and then performs the process 400 to generate the cumbersome target soft output for a given training input. In some implementations, the system performs the process 400 for the training input to generate an unsoftened cumbersome output for the training input and then generates the cumbersome target soft output by adjusting the unsoftened cumbersome output in accordance with the higher temperature value.

The description above describes implementations where the temperature value is a constant value. However, in some other implementations, the temperature value can vary during the process of training the distilled machine learning model. For example, the temperature value can be gradually increased during the training process, e.g., after each training iteration. As another example, the temperature value can be gradually decreased during the training process, e.g., after each training iteration.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatus for training a student machine learning model having a plurality of student model parameters on a set of multiple training inputs, wherein the student machine learning model is configured to process an input to generate an output that comprises a respective score for each of a plurality of classes, the method comprising:

processing each training input of the set of multiple training inputs using a teacher machine learning model to generate a target output for the training input, wherein the target output comprises a respective target score for each of the plurality of classes, wherein each target score satisfies:

$$q_i^t = \frac{\exp\left(\frac{z_i^t}{T^t}\right)}{\sum_j \exp\left(\frac{z_j^t}{T^t}\right)}$$

wherein $q_i^t$ is the target score for a class i, $z_i^t$ is an intermediate score generated by the teacher machine learning model for class i, $z_j^t$ is an intermediate score generated by the teacher machine learning model for class j, j ranges from 1 to a total number of classes in the plurality of classes, and $T^t$ is a temperature constant having a value that is greater than 1; and training the student machine learning model to, for each training input of the set of multiple training inputs, process the training input to generate an output that matches the target output generated by the teacher machine learning model for the training input.

2. The method of claim 1, wherein the teacher machine learning model is an ensemble model comprising a plurality of respective baseline machine learning models.

3. The method of claim 2, wherein processing a training input using the teacher machine learning model to generate a target output for the training input comprises:

processing the training input using each baseline machine learning model to generate a baseline output for the training input; and combining the baseline outputs for the training inputs to generate the target output for the training input.

4. The method of claim 1, wherein the student machine learning model comprises a neural network model.

5. The method of claim 1, wherein the student machine learning model has fewer model parameters than the teacher machine learning model.

6. The method of claim 1, wherein for each training input of the set of multiple training inputs, the output generated by student machine learning model for the training input comprises a respective output score for each of the plurality of classes, wherein each output score satisfies:

$$q_i^s = \frac{\exp\left(\frac{z_i^s}{T^s}\right)}{\sum_j \exp\left(\frac{z_j^s}{T^s}\right)}$$

wherein $q_i^s$ is the output score for a class i, $z_i^s$ is an intermediate score generated by the student machine learning model for class i, $z_j^s$ is an intermediate score generated by the student machine learning model for class j, j ranges from 1 to a total number of classes in the plurality of classes, and $T^s$ is a temperature constant having a value that is greater than 1.

7. The method of claim 1, further comprising training the student machine learning model to, for one or more training inputs of the set of multiple training inputs, process the training input to generate an output that matches a hard output for the training input, wherein the hard output comprises a respective hard score for each of the plurality of classes, wherein the hard score for a target class of the plurality of classes is equal to 1 and the hard score for each remaining class of the plurality of classes is equal to 0.

8. A system comprising:
one or more computers; and
one or more storage devices communicatively coupled to the one or more computers, wherein the one or more storage devices store instructions that, when executed by the one or more computers, cause the one or more computers to perform operations for training a student machine learning model having a plurality of student model parameters on a set of multiple training inputs, wherein the student machine learning model is configured to process an input to generate an output that comprises a respective score for each of a plurality of classes, the method comprising:
processing each training input of the set of multiple training inputs using a teacher machine learning model to generate a target output for the training input, wherein the target output comprises a respective target score for each of the plurality of classes, wherein each target score satisfies:

$$q_i^t = \frac{\exp\left(\frac{z_i^t}{T^t}\right)}{\sum_j \exp\left(\frac{z_j^t}{T^t}\right)}$$

wherein $q_i^t$ is the target score for a class 1, $z_i^t$ is an intermediate score generated by the teacher machine learning model for class i, $z_j^t$ is an intermediate score generated by the teacher machine learning model for class j, j ranges from 1 to a total number of classes in the plurality of classes, and $T^t$ is a temperature constant having a value that is greater than 1; and
training the student machine learning model to, for each training input of the set of multiple training inputs, process the training input to generate an output that matches the target output generated by the teacher machine learning model for the training input.

9. The system of claim 8, wherein the teacher machine learning model is an ensemble model comprising a plurality of respective baseline machine learning models.

10. The system of claim 9, wherein processing a training input using the teacher machine learning model to generate a target output for the training input comprises:
processing the training input using each baseline machine learning model to generate a baseline output for the training input; and
combining the baseline outputs for the training inputs to generate the target output for the training input.

11. The system of claim 8, wherein the student machine learning model comprises a neural network model.

12. The system of claim 8, wherein the student machine learning model has fewer model parameters than the teacher machine learning model.

13. The system of claim 8, wherein for each training input of the set of multiple training inputs, the output generated by student machine learning model for the training input comprises a respective output score for each of the plurality of classes, wherein each output score satisfies:

$$q_i^s = \frac{\exp\left(\frac{z_i^s}{T^s}\right)}{\sum_j \exp\left(\frac{z_j^s}{T^s}\right)}$$

wherein $q_i^s$ is the output score for a class i, $z_i^s$ is an intermediate score generated by the student machine learning model for class i, $z_j^s$ is an intermediate score generated by the student machine learning model for class j, j ranges from 1 to a total number of classes in the plurality of classes, and $T^s$ is a temperature constant having a value that is greater than 1.

14. The system of claim 8, wherein the operations further comprise training the student machine learning model to, for one or more training inputs of the set of multiple training inputs, process the training input to generate an output that matches a hard output for the training input, wherein the hard output comprises a respective hard score for each of the plurality of classes, wherein the hard score for a target class of the plurality of classes is equal to 1 and the hard score for each remaining class of the plurality of classes is equal to 0.

15. One or more non-transitory computer storage media storing instructions that when executed by one or more computers cause the one or more computers to perform operations for training a student machine learning model having a plurality of student model parameters on a set of multiple training inputs, wherein the student machine learning model is configured to process an input to generate an output that comprises a respective score for each of a plurality of classes, the method comprising:
processing each training input of the set of multiple training inputs using a teacher machine learning model to generate a target output for the training input, wherein the target output comprises a respective target score for each of the plurality of classes, wherein each target score satisfies:

$$q_i^t = \frac{\exp\left(\frac{z_i^t}{T^t}\right)}{\sum_j \exp\left(\frac{z_j^t}{T^t}\right)}$$

wherein $q_i^t$ is the target score for a class i, $z_i^t$ is an intermediate score generated by the teacher machine learning model for class i, $z_j^t$ is an intermediate score generated by the teacher machine learning model for class j, j ranges from 1 to a total number of classes in the plurality of classes, and $T^t$ is a temperature constant having a value that is greater than 1; and
training the student machine learning model to, for each training input of the set of multiple training inputs, process the training input to generate an output that matches the target output generated by the teacher machine learning model for the training input.

16. The non-transitory computer storage media of claim 15, wherein the teacher machine learning model is an ensemble model comprising a plurality of respective baseline machine learning models.

17. The non-transitory computer storage media of claim 16, wherein processing a training input using the teacher machine learning model to generate a target output for the training input comprises:
  processing the training input using each baseline machine learning model to generate a baseline output for the training input; and
  combining the baseline outputs for the training inputs to generate the target output for the training input.

18. The non-transitory computer storage media of claim 15, wherein the student machine learning model comprises a neural network model.

19. The non-transitory computer storage media of claim 15, wherein the student machine learning model has fewer model parameters than the teacher machine learning model.

20. The non-transitory computer storage media of claim 15, wherein for each training input of the set of multiple training inputs, the output generated by student machine learning model for the training input comprises a respective output score for each of the plurality of classes, wherein each output score satisfies:

$$q_i^s = \frac{\exp\left(\frac{z_i^s}{T^s}\right)}{\sum_j \exp\left(\frac{z_j^s}{T^s}\right)}$$

wherein $q_i^s$ is the output score for a class i, $z_i^s$ is an intermediate score generated by the student machine learning model for class i, $z_j^s$ is an intermediate score generated by the student machine learning model for class j, j ranges from 1 to a total number of classes in the plurality of classes, and $T^s$ is a temperature constant having a value that is greater than 1.

* * * * *